United States Patent [19]

Jourquin et al.

[11] Patent Number: 5,662,996
[45] Date of Patent: Sep. 2, 1997

[54] METHOD FOR MANUFACTURING SELF-SUPPORTING SYNTHETIC TRIM PARTS AND THUS MANUFACTURED TRIM PARTS

[75] Inventors: Lucien Jourquin, Wetteren; Bernard Debaes, Sijsele; Eddie Du Prez, Brakel, all of Belgium

[73] Assignee: Recticel, Brussels, Belgium

[21] Appl. No.: 338,463

[22] PCT Filed: May 19, 1993

[86] PCT No.: PCT/BE93/00026

§ 371 Date: Jan. 19, 1995

§ 102(e) Date: Jan. 19, 1995

[87] PCT Pub. No.: WO93/23237

PCT Pub. Date: Nov. 25, 1993

[30] Foreign Application Priority Data

May 18, 1992 [BE] Belgium ............... 09200455

[51] Int. Cl.⁶ ................ B29C 44/06; B29C 44/12
[52] U.S. Cl. ................ 428/318.8; 428/309.9; 264/46.4; 264/255; 264/309; 264/328.18
[58] Field of Search ................ 428/304.4, 316.6, 428/308.4, 309.9, 318.8; 264/255, 309, 46.4, 46.6, 45.3, 257, 328.18

[56] References Cited

U.S. PATENT DOCUMENTS

| 3,872,199 | 3/1975 | Ottinger | 264/309 |
| 3,929,948 | 12/1975 | Welch et al. | 264/46.4 |
| 3,933,548 | 1/1976 | Anderson, Jr. et al. | 156/78 |
| 3,974,320 | 8/1976 | Gerlach et al. | 428/283 |
| 4,025,372 | 5/1977 | Fenton | 264/46.8 |
| 4,217,381 | 8/1980 | Asano | 427/340 |
| 4,389,454 | 6/1983 | Horacek et al. | 264/46.6 |
| 4,399,174 | 8/1983 | Tanaka et al. | 428/308.4 |
| 4,810,452 | 3/1989 | Taillefert et al. | 264/46.4 |
| 5,073,429 | 12/1991 | Steinke et al. | 428/309.9 |
| 5,116,557 | 5/1992 | Debaes et al. | 264/255 |
| 5,316,822 | 5/1994 | Nishijima et al. | 264/46.4 |
| 5,389,317 | 2/1995 | Grimmer | 264/309 |
| 5,403,645 | 4/1995 | Stein et al. | 428/309.9 |
| 5,411,688 | 5/1995 | Morrison et al. | 264/255 |
| 5,418,032 | 5/1995 | Martin | 428/318.8 |

*Primary Examiner*—Allan R. Kuhns
*Attorney, Agent, or Firm*—Finnegan, Henderson, Farabow, Garrett & Dunner

[57] ABSTRACT

In the method according to the invention, a layer of polyurethane elastomer for obtaining a polyurethane skin (5) is produced, in a first step, against a mould surface (1). In a second step, a reaction mixture for obtaining a polyurethane foam layer (6) is applied against this polyurethane skin (5). In a third step, a suitable polyurethane or polyisocyanurate reaction mixture for obtaining a rigid synthetic carrier (8) is applied against the polyurethane foam layer (6). In this way, a synthetic trim part is obtained which is easier to recycle. This method can moreover also be performed easier.

23 Claims, 5 Drawing Sheets

METHOD FOR MANUFACTURING SELF-SUPPORTING SYNTHETIC TRIM PARTS AND THUS MANUFACTURED TRIM PARTS

BACKGROUND OF THE INVENTION

This invention relates to a method for manufacturing self-supporting synthetic trim parts, in particular car interior parts such as dashboards, doorpanels, consoles and glove compartments, having an elastomeric polyurethane skin, a rigid synthetic carrier and a mainly open-cell polyurethane foam layer therebetween.

Such a method is for example already disclosed in the Belgian patent application No. 08900228 of the same applicant. In this method, a layer of polyurethane elastomer is first sprayed against an inner surface of a mould. Then, a previously manufactured insert is positioned into this mould and the space between the insert and the elastomeric layer is filled with a polyurethane foam.

A drawback of this known method consists in that the insert, or in other words the rigid carrier, has to be manufactured in advance in a separate mould. This insert must moreover be accurately positioned into the second mould in order that the foam layer would have everywhere the desired thickness. Especially when this foam layer has to be thin, an exact positioning of the insert is important since a small variation of the foam thickness becomes in this event soon perceptible from the outside. In the case of thin foam layers, extending over a large surface, it is further difficult in the known method to spread the reaction mixture for obtaining this foam sufficiently homogeneously over this surface.

The invention aims now to obviate these different drawbacks and this by proposing a new method for manufacturing self-supporting synthetic trim parts which permits moreover the trim parts to be recycled in a simpler way after they have been put out of use.

SUMMARY OF THE INVENTION

This method is characterized according to the invention by the fact that, in a first step, a polyurethane skin of a polyurethane elastomer and prepared either or not in advance is applied against a mould surface; in a second step, a reaction mixture for obtaining said polyurethane foam layer is applied by spraying against said polyurethane skin; and, in a third step, a suitable polyurethane or polyisocyanurate reaction mixture for obtaining said rigid synthetic carrier is applied against the polyurethane foam layer.

A similar method for manufacturing a trim part having an elastomeric skin, a rigid synthetic carrier and a foam layer therebetween is disclosed in JP-A-2047022. In this known method a PVC/ABS skin having an adjoining polyolefin foam layer is positioned into a mould and the rigid carrier, in this case rigid polyurethane, is subsequently, after having closed this mould, applied against the back of the foam layer by a RIM-proces (Reaction Injection Moulding). According to this Japanese patent application, it is however essential for the polyolefin foam layer to be of a closed cell-structure, in contrast therefore to the polyurethane foam layer according to the present invention. Since the material of these closed cell foam layer and also the material of the skin layer are essentially different from the material of the carrier, the trim parts obtained by this known method are hard to recycle.

According to the invention, however, it has now been found that, when the open-cell polyurethane foam layer is applied by spraying against the polyurethane skin, it is possible to apply also against this open-cell foam layer a rigid polyurethane carrier by a mould or a spray process. Due to the open-cell structure of the polyurethane foam layer, it is possible to obtain a trim part having an outer surface which, upon touching, gives a feeling which approaches very closely the touch of a natural leather skin, whereas for a closed-cell structure a rather pneumatically resilient effect is obtained upon touching. Moreover, it has been observed that by the spray process a foam layer having a natural or integral skin is obtained which prevents the reaction mixture for the carrier from penetrating therein while a good adhesion is anyway also obtained. The used spray technique for applying the foam layer against the polyurethane skin allows moreover to vary the thickness of this foam layer from place to place as desired.

An important advantage of the method according to the invention is further that trim parts are obtained which are much easier to recycle compared to the existing parts. As a matter of fact, the existing trim parts, in particular the existing dashboards, are composed of different synthetic materials, this a.o. in order to be able to meet the severe quality requirements to which these products are subjected. In order to permit such composite materials to be recycled, a prior separation is required which involves usually important technical problems and which is therefore commercially not feasible.

In a first particular embodiment of the method according to the invention, the reaction mixture for obtaining the synthetic carrier is applied by spraying against the polyurethane foam layer, in particular by means of a two-component spray gun. This method offers the advantage that the foam layer will not be deformed and that the polyurethane skin will consequently maintain its shape after demoulding.

In a further particular embodiment of the method according to the invention, the polyurethane skin and the polyurethane foam layer are applied in a mould and, in said third step, this mould is closed and the reaction mixture for obtaining the synthetic carrier is injected into this mould against the polyurethane foam layer. In this way there is also obtained a dimensionally stable back which does not require any further finishing.

In a preferred embodiment of the method according to the invention, a polyurethane skin is produced, in said first step, having a thickness of 0.3 to 1.3 mm, and preferably a thickness of 0.4 to 1.0 mm. By manufacturing such thin polyurethane skins, it is possible to obtain a trim part, the visible side of which shows a so-called leather touch, especially when the underlying foam layer has a thickness of 1 to 7 mm, and more particularly of 2 to 3 mm.

The invention further relates to self-supporting synthetic trim parts which are obtained by applying the hereabove described method according to the invention and which hence comprise an elastomeric polyurethane skin, a rigid polyurethane or polyisocyanurate carrier and a polyurethane foam layer therebetween.

BRIEF DESCRIPTION OF THE DRAWINGS

Further particularities and advantages of the method and the trim parts according to the invention will become apparent from the following description of some particular embodiments of the invention. This description is only given by way of example and is not intended to limit the scope of the invention. The reference numerals used hereinafter relate to the annexed drawings wherein.

In these different figures, the same reference numerals relate to the same or to analogous elements.

DETAILED DESCRIPTION OF THE INVENTION

The invention generally relates to a method for manufacturing self-supporting synthetic trim parts having an elastomeric polyurethane skin, a rigid synthetic carrier and a polyurethane foam layer therebetween. Such trim parts are especially used as car interior parts such as dashboards, doorpanels, consoles, glove compartments, etc. ...

In a specific embodiment of the method according to the invention; the different layers of the trim parts are mainly made of polyurethane so that a complex is obtained which is easier to recycle. The presently existing trim parts on the contrary consist of complexes of different materials such as PVC, ABS, PU, etc., which, in view of their difference in nature and composition, cannot or hard to recycle simultaneously. These known trim parts require therefore a previous separation of the composing components which cannot or which is difficult to realize.

The invention provides now a new method which permits trim parts, as described hereinabove, to be manufactured in a technically and economically well considered way substantially exclusively on the basis of polyurethane. To this end, a layer of polyurethane elastomer for obtaining the polyurethane skin is produced, in a first step, against a mould surface. Then, a reaction mixture for obtaining the mainly open-cell polyurethane foam layer is applied, in a second step, by spraying against the polyurethane skin. Finally, a suitable polyurethane or possibly polyisocyanurate reaction mixture for obtaining the rigid synthetic carrier is applied, in a third step, against the polyurethane foam layer.

Figure 1:
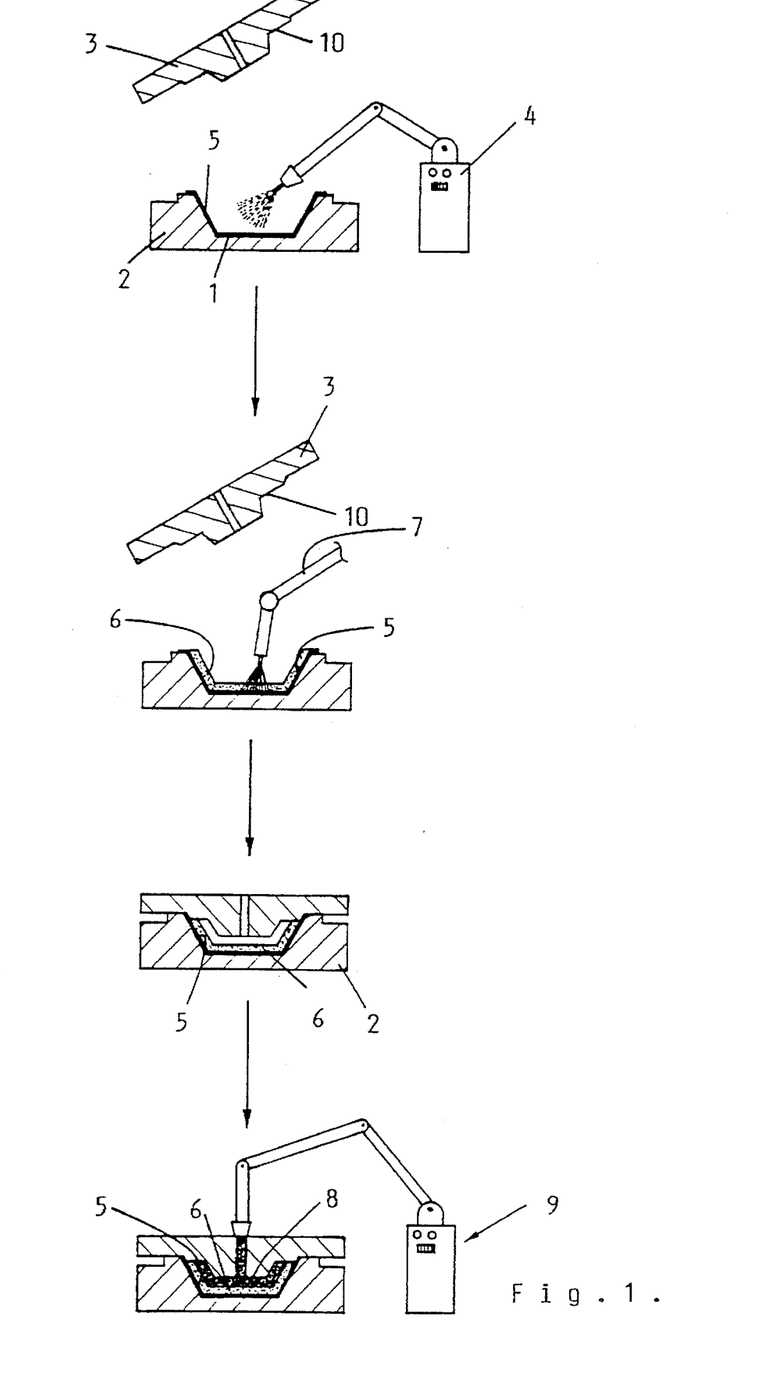
FIG. 1 shows a schematic representation of the different steps of a first embodiment of the method according to the invention.

FIG. 1 shows schematically a first embodiment Of the method according to the invention.

On the mould surface 1 of a first part 2 of a two-part mould 2,3 there is applied, by spraying by means of a spray gun 4, a polyurethane elastomer layer 5 which forms the skin 5 of the trim part. This can be done according to the technique described in the Belgian patent application No. 8700792 of the same applicant.

In a second step, a reaction mixture for obtaining a polyurethane foam layer 6 is sprayed by means of a second spray gun 7 against the back of the polyurethane skin 5, preferably when the skin 5 is still somewhat sticky.

Then, in a third step, the mould 2, 3 is closed and a suitable reaction mixture for obtaining the rigid polyurethane carrier 8 is injected into the mould cavity by means of a third spray gun 9.

For producing the polyurethane skin 5 a light-stable, mass-stained colored polyurethane reaction mixture is sprayed in the first embodiment, as shown in FIG. 1, against the mould surface 1. Such reaction mixtures are for example disclosed in the Belgian patent application No. 8900067 of the same application. These light-stable reaction mixtures are based on an aliphatic polyisocyanate.

In a variant embodiment, a light-stable colored polyurethane paint or in o.w. a so-called PU inmoldpaint, is applied first, in the first step, onto the mould surface. This paint composes together with the elastomeric layer applied thereto subsequently, the polyurethane skin 5. In this embodiment, use can be made of an aromatic polyurethane system for the elastomeric layer.

In a further variant embodiment, the polyurethane skin is made of thermoplastic polyurethane (TPU). This TPU can be prepared on the basis of aromatic, aliphatic or alicyclic isocyanates. Use can be made of a TPU foil which is applied first by thermoforming against a mould surface. This thermoforming process can be performed in the mould 2, 3 or possibly in another mould after which the thermoformed TPU foil is positioned then into the mould 2, 3. In order to make this foil to fit well against the mould surface 1, this foil is preferably sucked against this surface. The TPU skin can also be prepared on the basis of a TPU powder, in particular by a so-called powder slush molding process in a heated rotating mould. The obtained TPU skin can subsequently also be placed against the mould surface 1 of the mould 2, 3.

The polyurethane skins are usually manufactured against a mould surface, the surface structure of which is provided for giving the skins the look of natural leather. The open-cell polyurethane foam 6 which is applied against the back of these skins 5, provides for a so-called soft touch. The reaction mixture for obtaining the polyurethane foam layer 6 is preferably composed in such a manner that a semi-flexible polyurethane foam is obtained. Especially the amount of so-called cross-linkers in the reaction mixture is important in this respect. In a particular embodiment, use is made in this reaction mixture substantially exclusively of water as blowing agent. The polyisocyanate component is for example based on MDI.

In a preferred embodiment, an open-cell polyurethane foam layer 6 having a thickness of 1 to 7 mm and preferably of 2 to 3 mm is applied. In order to approach as much as possible the touch of natural leather, such a foam layer 6 is combined with a polyurethane skin 5 having a thickness of 0.3 to 1.3 mm and preferably of 0.4 to 1.0 mm. Since such thin skins are hard to transfer from one mould to another, they are preferably produced directly in the mould 2, 3 by a spray process.

In order to finish the trim part further on the back or inner side, a polyurethane finishing layer may also be applied against the mould surface 10 of the second mould part 3 in the first step.

In a first embodiment, a previously produced TPU skin is applied to this end for example against this mould surface 10.

In a further embodiment, a polyurethane paint is sprayed against the mould surface 10, either or not followed by the application of an elastomeric polyurethane layer and a further polyurethane foam layer. In the latter case, a leather like coating is also obtained on the back.

Instead of the combination of the polyurethane paint layer and the elastomeric layer, it is of course also possible to use a light-stable elastomeric polyurethane layer.

The rigid carrier 8 can, as shown in FIG. 1, be produced in a mould cavity by injecting a suitable reaction mixture. This offers the advantage that also the back of the trim part has the right dimensions and is as such ready for mounting. The reaction mixture for obtaining the rigid carrier 8 may further also be applied by spraying against the back of the complex of elastomeric skin 5 and foam layer 6. In this way substantially no pressure is exerted onto the foam layer 6 and deformations of this foam layer 6 are consequently avoided. Avoiding such deformations and especially local deformations, for example against corners of the mould surface, is important. Indeed, after demoulding, the compressed foam layer will reexpand and external deformations of the skin of the trim part will occur on places where the foam layer expands stronger, or in o.w. on places where the foam layer was stronger compressed. The rigid carrier can be produced by rigid PU-systems, in particular by the so-called SRIM systems.

In case the rigid carrier 8 is produced in a mould cavity, the reaction mixture for obtaining this carrier is preferably composed and applied in such a manner in the mould cavity that during applying and curing of this reaction mixture a pressure is exerted onto the polyurethane foam layer 6 which is lower than the pressure required for a 25% compression of this polyurethane foam layer and which is preferably lower than the pressure required for a 10% compression of the foam layer. This compression has to be measured on a place where the foam layer rests against a flat surface. In order to reduce the compression of the foam layer 6 when applying the reaction mixture for obtaining the rigid carrier as much as possible, use is made of a reaction mixture which has a viscosity lower than 3000 mmPa.s at 25° C. and preferably lower than 1000 mPa.s. The components of this reaction mixture are preferably brought to a temperature of 20° to 100° C. and in particular to a temperature comprised between 45° and 70° C. As result of the viscosity reduction, a lower pressure is required for injecting the reaction mixture.

In a particular embodiment, the reaction mixture for obtaining the carrier is substantially free of blowing agents so that substantially no pressure is generated during the reaction of the different components. This reaction mixture comprises typically a polyol and a polyisocyanate component. The polyol component comprises up to 1% by weight at the most and preferably up to 0.1% by weight at the most of water.

In a further particular embodiment, the reaction mixture for obtaining the carrier does comprise blowing agents so that the carrier is composed of a rigid polyurethane foam. When use is made in this case of a closed mould, an accurate control of the total amount of injected reaction mixture and of the amount of blowing agent is required to avoid an excessive compression of the foam layer.

In a preferred embodiment, the carrier is reinforced by means of glass fibres so that the shrinkage of the carrier is under control and the rigidity is increased. The glass fibres may be admixed to the reaction mixture for obtaining the rigid carrier, for example in a so-coiled SRIM system. Further use can be made of a glass fibre mat which is placed over the foam layer before applying the reaction mixture for obtaining the rigid carrier. The glass fibre mat is preferably applied when the foam layer is still sticky. The glass fibre mat and the glass fibres admixed into the reaction mixture may possibly be used in combination.

In order to illustrate the method according to the invention, four concrete examples are further given hereinafter of the method according to the invention and especially of the chemical formulations of the polyurethane skin, the foam layer as well as of the rigid carrier.

EXAMPLE 1

The method according to this example is in particular suited for manufacturing a glove compartment cover having a surface of for example 600 cm². The model of this glove compartment cover includes no undercuts so that only one two-part mould, analogous to the one indicated in FIG. 1, has to be used for the whole process. The lowermost part 2 of this mould 2,3 comprises a galvanoplate showing a leather structure.

In a preparatory step, the lowermost 2 and the uppermost mould halves 3 are treated with a mould release agent such as for example Acmosil 180 SFC (Acmos) or Aquathan 61-360 (Block Chemie).

On the lowermost mould part 2 a polyurethane skin 5 is produced by means of a two-component spray gun 4. For manufacturing this skin 5 use is made of the Colofast® Spray BLS system (trademark of Recticel) which allows to produce a mass-stained light-stable microcellular elastomeric skin. The first component of this system, i.e. Isofast 3430 A (Recticel), is supplied at a flow rate of 3.67 g/sec, whereas the second component, i.e. Polyfast 3530 A (Recticel), is supplied at a flow rate of 6.33 g/sec. The total flow rate comprises therefore 10.0 g/sec. The controlled spray time comprises 6 sec. In this Way a polyurethane skin 5 is obtained having a thickness of about 1 mm.

Immediately after the reaction, a layer of about 2 mm semi-flexible open-cell polyurethane foam 6 is applied on top of this polyurethane skin 5 by means of a second two-component spray gun 7. For producing this foam layer 6 use is made of the following waterblown MDI system:

| Polyol component: | | |
|---|---|---|
| Specflex NM 805 (Dow) | 100 | |
| Butanediol 1,4 (Hüls) | 3 | |
| Water | 0.9 | 104.95 |
| Dabco 33Lv (Air Products) | 1.0 | |
| Fomrez UL28 (Witco) | 0.05 | |

Isocyanate component: Suprasec VM12(I.C.I.) 24.12

Isocyanate index: 60

Flow rate of polyol component: 4.88 g/sec

Flow rate of isocyanate component: 1.12 g/sec

Total flow rate: 6.00 g/sec.

After a controlled spray time of 6 sec. with the spray gun 7, a thin layer of semi-flexible open-cell foam provided with a natural skin towards the side of the gun is obtained having a total thickness of ±2 mm and the so-called overall density of which comprises ±450 gr/liter.

By adjusting the robot program the thickness of the semi-flexible layer may vary from place to place. This thin foam layer gives the elastomeric "Colofast" skin, a so-called soft touch specific to natural leather.

Before closing the mould for the third operation, the production of the rigid carrier, a glass mat is applied onto the surface of the freshly sprayed semi-flexible foam which is still sticky, for example of Unifill U816: 450 gr/m² type. The mould is closed and the formed cavity is filled with the two-component rigid

| PU system 8 consisting of: | |
|---|---|
| Polyol PU 1391 (Bayer) | 9.00 gr/sec. |
| Iso PU 1511 (Bayer) | 9.00 gr/sec. |
| Total | 18.00 gr/sec. |
| Injection time | 5 sec. |
| Polyol component: | |
| Temperature | 45° C. |
| Viscosity (at 45° C.) | 340 mPa · s |
| Water content | 0.06 |

-continued

| Isocyanate component: | |
|---|---|
| Temperature | 45° C. |
| Viscosity (at 45° C.) | 65 mPa · s |

In this way a rigid carrier of a thickness of ±3 mm which forms a monolith unit with the semi-flexible foam layer and the skin is produced.

After demoulding, a dimensionally stable glove compartment cover is obtained since the pressure exerted by the rigid PU system was lower than the compression force of the semi-rigid foam layer at a deformation of 0.2 mm. The pressure required for a 10% deformation (±0.2 mm) of the semi-flexible foam is 13 KPa at 80° C.

EXAMPLE 2

This example is identical to Example 1 except for the fact that the "Colofast" polyurethane skin is replaced by a so-called polyurethane inmold paint followed by a two-component aromatic microcellular elastomeric system.

The inmold paint is in this case a light-stable two-component PU system, in particular Isothan-IMP-2K-Klarlack ME 170 of ISL Chemie.

Some inmold paints such as for example Rimbond 200 of Mc. Pherson Industrial Coatings have self release properties, so that the amount of a mould release agent on the lowermost mould part 2 can be reduced or avoided. The thickness of the inmold paint film comprises ±20μ.

After evaporation of the solvent, which takes about 30 sec., the second layer, a PU elastomer, is applied by means of a two-component gun. This solventless elastomeric system consists of:

| 1. Polyol-component | |
|---|---|
| Polyethertriol: condensate of propylene en ethylene oxyde on glycerine - IOH index 28 - content of primary OH groeps 85% | 90 |
| Dabco 33Lv (Air Products) | 2.25 |
| Butanediol (Hüls) | 7.9 |
| Color paste | 5 |
| | 105.15 |
| Viscosity at 25° C. in mPa · s | 1060 |
| Viscosity at 45° C. in mPa · s | 320 |
| 2. ISO-component | |
| Isocyanate RMA 200 (Dow) | 43.5 |
| Viscosity at 25° C. in mPa · s | 620 |
| Viscosity at 45° C. in mPa · s | 126 |

This system is based on aromatic isocyanates and is therefore not light-stable or colored. These lacking properties are obtained by the previously applied PU inmold paint. In this way, there is also obtained a light-stable colored 100% PU skin.

EXAMPLE 3

Figure 2:
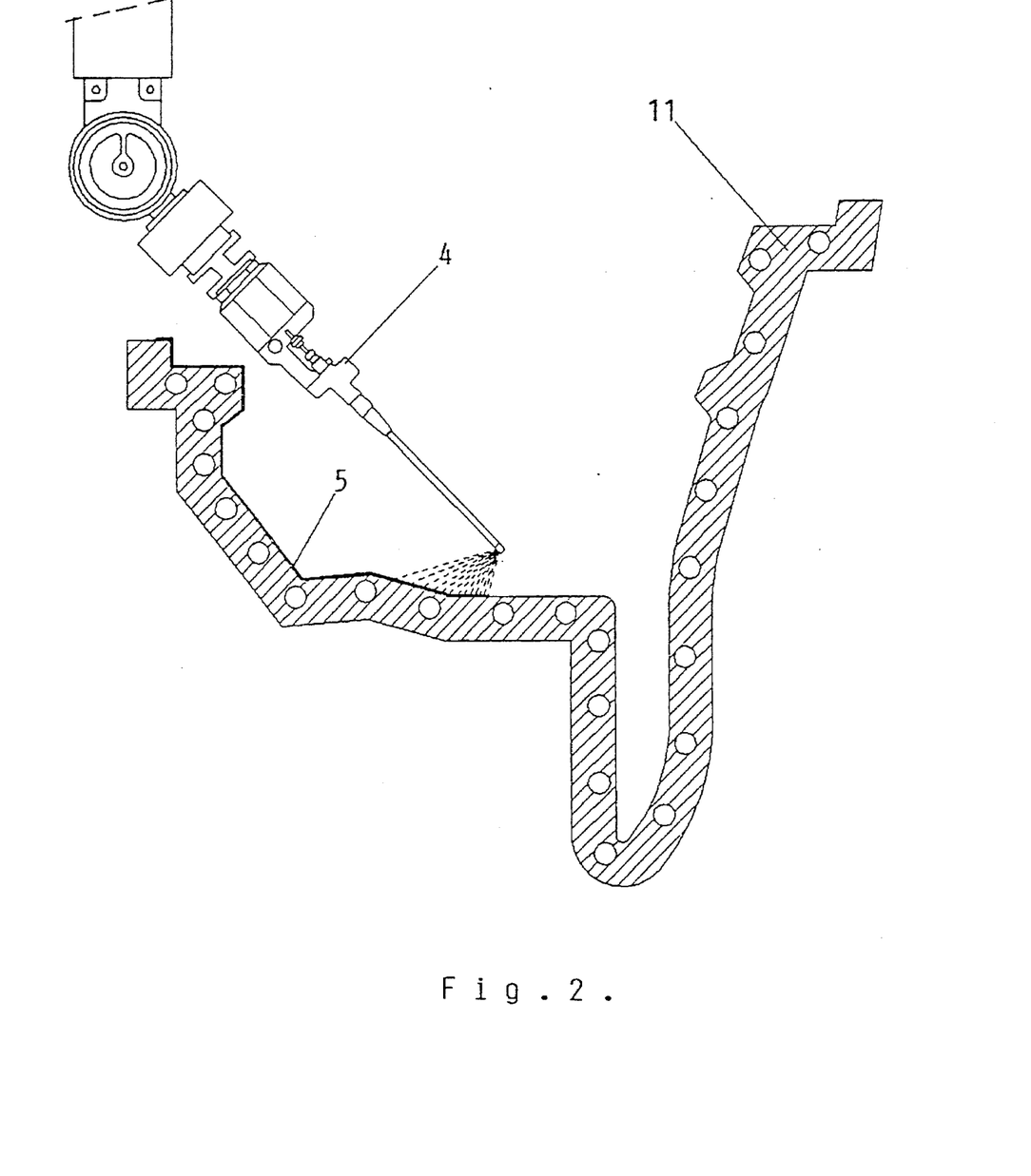
FIGS. 2, 3 and 4 show schematically the different steps of a second embodiment of the method according to the invention.
Figure 3:
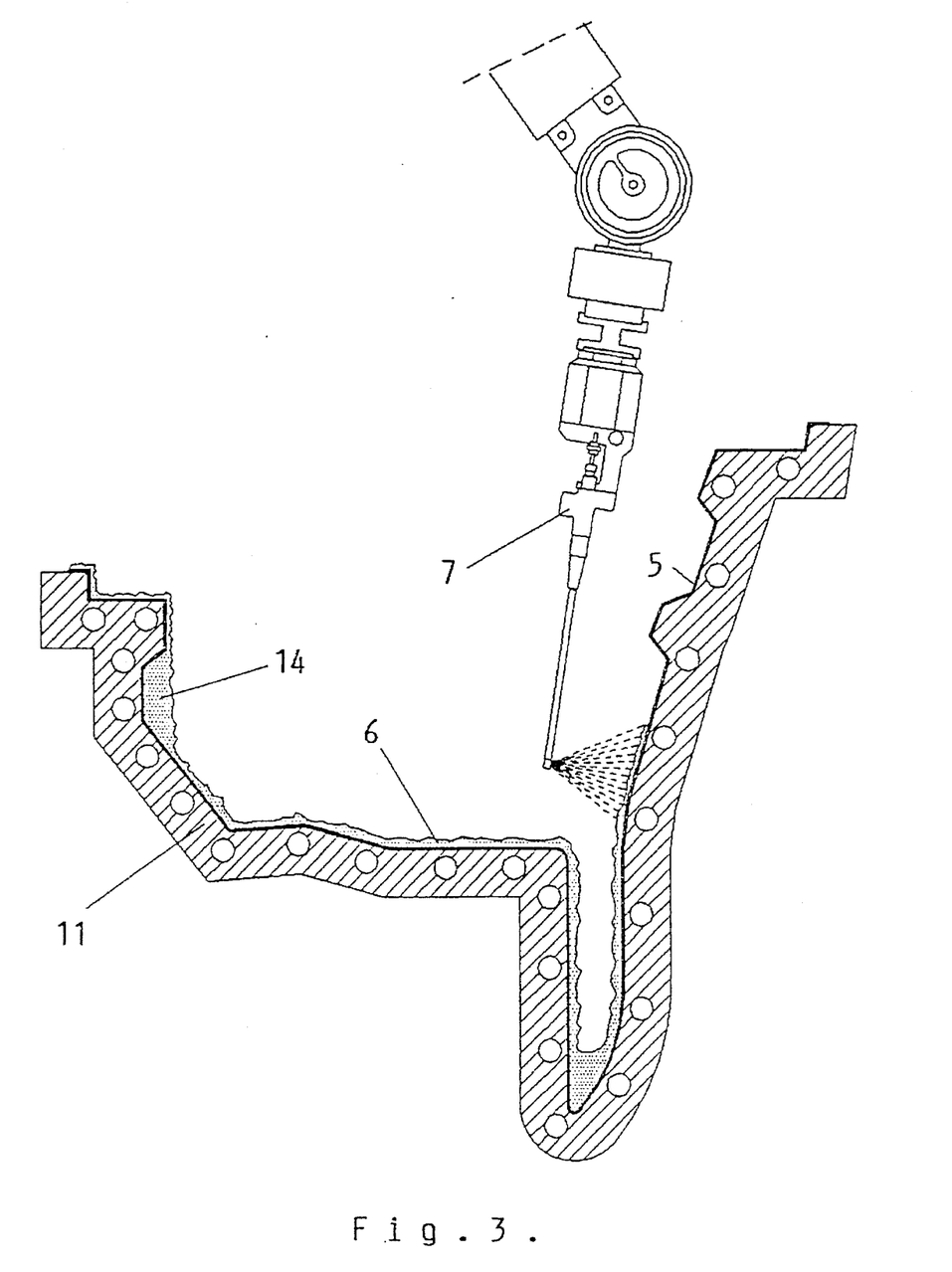
Figure 4:
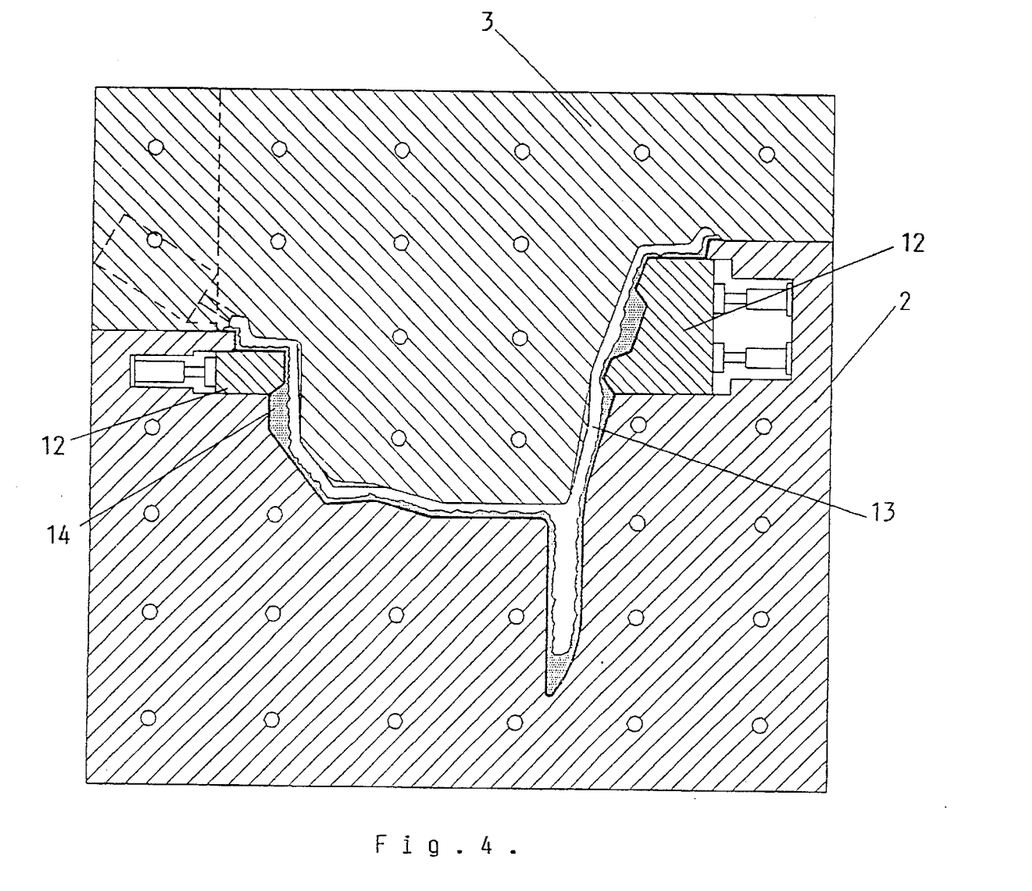

In this example an instrument panel manufactured by means of a mould showing undercuts (see FIGS. 2, 3 and 4).

As shown in FIG. 2, a microcellular mass-stained light-stable "Colofast" spray skin 5, as in example 1, is prepared by means of a two-component spray gun 4 in a separate galvano plate 11 provided with a mould release agent.

Immediately after this operation, a layer of ±3 mm of the same waterblown MDI semi-flexible foam 6 as in example 1 is applied, in the same open mould by means of a two-component gun 7 on top of the skin 5 (see FIG. 3). As indicated in FIG. 3, the undercuts 14 in the mould are also filled with the semi-flexible foam and this in order to permit the rigid core to be demoulded later. After the demoulding, this flexible complex is transferred to a second mould 2, 3 provided with the necessary slides 12 (see FIG. 4). After positioning the skin—foam complex, the uppermost mould part 3 is closed. The so-formed cavity 13 is filled with a low viscosity two-Component rigid PU system which consists in particular of:

| Polyol Daltocast 4 (ICI) | 100 parts | |
|---|---|---|
| ISO Suprasec DNC (ICI) | 136 parts | |
| Polyol temperature 95° C. | | Viscosity 20 mPa · s |
| Isocyanate temperature 45° C. | | Viscosity 65 mPa · s |
| Water content of the polyol 0.05% | | |

This cavity 13 can be filled either or not before closing the upper part 3 with a glass fibre mat. After 5 min., the complex is demoulded and an instrument panel is obtained consisting of a rigid PU carrier, a light-stable skin and a soft touch layer therebetween.

EXAMPLE 4

This example differs from example 3 in that the non-blown rigid polyurethane system for obtaining the carrier is replaced by a blown rigid foam system of a lower density and a good flow; in particular the Baydur STR/F/system reinforced with glass fibres. The used PU system consists of:

| Polyol PU 0768C (Bayer) | 100 parts |
|---|---|
| Isocyanate 44 V10 F (Bayer) | 170 parts |

Figure 5:
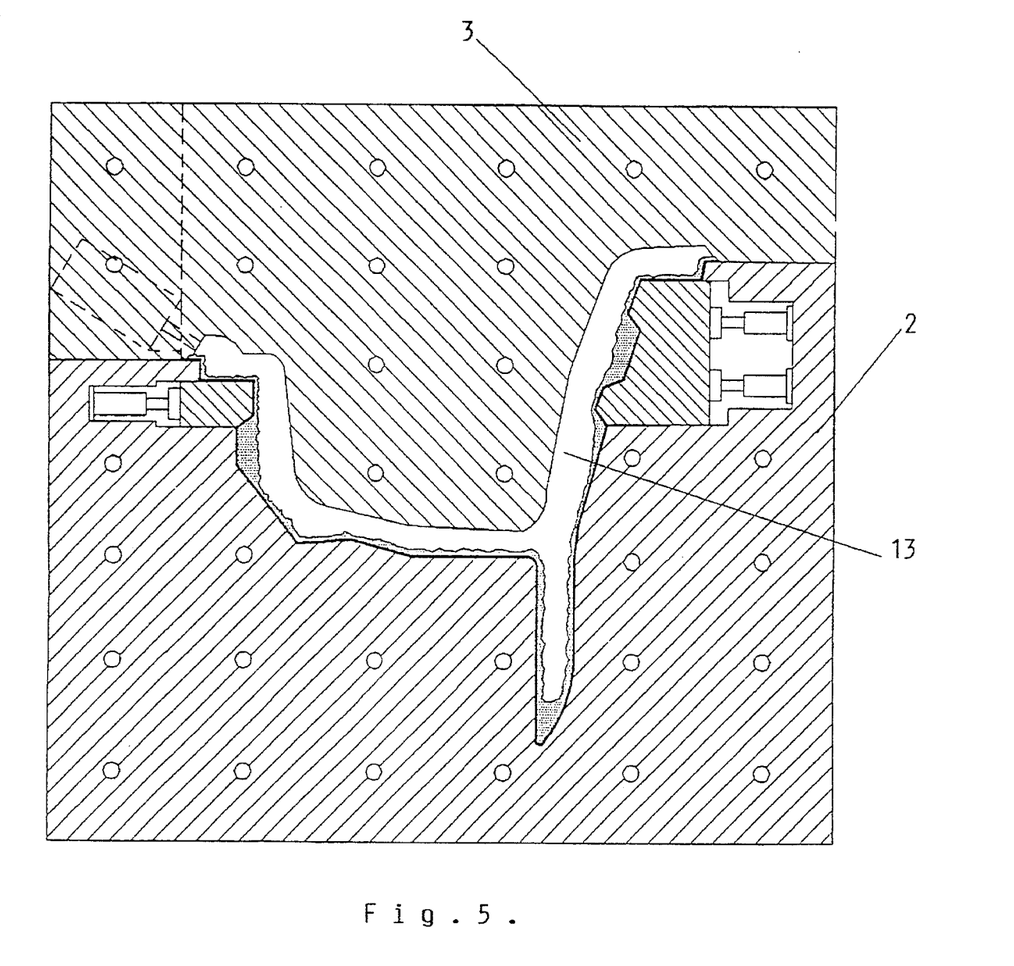
FIG. 5 is analogous to FIG. 4 but relates to a different last step.

After a substantially free rise of this PU system in the mould cavity 13, a rigid foam having a specific weight (RG) of about 60 kg/m$^3$ is obtained. In order to obtain a sufficient rigidity in case of this lighter rigid foam system, the mould cavity has to be thicker than in example 3, as shown in FIG. 5.

EXAMPLE 5

This example relates to a method which is in particular suited for manufacturing a doorpanel, only one side of which is provided with a decorative polyurethane skin. This method allows to produce in one one-part mould, without undercuts, a self-supporting doorpanel provided with a soft touch layer 6 between the decorative polyurethane skin 5 and the rigid polyurethane carrier 8.

To this end, use can be made for example of a mould which is analogous to the lowermost mould half 2 of the mould 2, 3 shown in FIG. 1. In this embodiment, the mould is therefore restricted to an open galvano-plate which represents the visible side of the doorpanel.

On this galvanoplate, the polyurethane skin 5 and the foam layer 6 are applied successively by means of the spray guns 4 and 7 in the same way as in example 1. Immediately afterwards, instead of using a pouring system for making the rigid polyurethane carrier, this carrier is applied according to a two-component spray system.

In particular use is for example made of the following "Elastocoat" system of Elastogran:

| | |
|---|---|
| Polyol component Elastocoat C 6815/65 | 100 parts |
| Isocyanate component Elastocoat C 6815/65 | 71 parts |
| Viscosity at 25° C.: polyol component | 1650 ± 100 mPa · s |
| isocyanate comp. | 600 ± 50 mPa · s |

Both components are used at a temperature of 45° to 60° C. The reaction time comprises at this temperature 3 ±2 sec. In view of the high reactivity, a high pressure spray gun has to be used. The total flow rate comprises ±30 gr/sec. so that for a surface of 2000 cm² and a layer thickness of ±3 mm, a spray time of ±20 sec. is required. The so-obtained rigid PU carrier has a bending module of ±600 N/mm² according to DIN 58457. Since no blowing agents are incorporated into this system, a quasi non-cellular material having a density of between 0.95 and 1.05 gr/cm³ is obtained. The bending module can be increased by making use of a glass fibre reinforcement.

In a variant of this method, the quasi non-cellular rigid PU carrier can be replaced by an expanded PU rigid foam spray system which is known per se as insulating material. In view of the lower density of such a foam (±40 gr/dm³) the PU rigid foam carrier will occupy in this case a larger volume (thickness) for a same rigidity.

It is clear that the invention is in no way limited to the hereabove described embodiments and that many modifications can be considered within the scope of this invention a.o. as to the kind of the skin, the foam layer and the rigid carrier as well as the techniques for applying the skin and the foam layer and for injecting the rigid carrier.

We claim:

1. A method for manufacturing a self-supporting synthetic trim part having a leatherlike touch and including an elastomeric polyurethane skin, a rigid synthetic carrier and a mainly open-cell polyurethane foam layer therebetween, said method comprising applying, in a first step, an elastomeric polyurethane skin having a thickness of from 0.3 to 1.3 mm of a polyurethane elastomer against a mold surface; applying, in a second step, by spraying against said elastomeric polyurethane skin, a reaction mixture for obtaining a mainly open-cell polyurethane foam layer having a thickness of from 1 to 7 mm and an integral skin thereon opposite said elastomeric polyurethane skin; and applying, in a third step, a suitable polyurethane or polyisocyanurate reaction mixture for obtaining a rigid synthetic carrier against said integral skin of said polyurethane foam layer.

2. The method of claim 1, wherein said reaction mixture for obtaining the synthetic carrier is applied by spraying the mixture against the integral skin of said polyurethane foam layer.

3. The method of claim 1, wherein said polyurethane skin and said polyurethane foam layer are applied in the mold and, in said third step, this mold is closed and the reaction mixture for obtaining the synthetic carrier is applied by injecting and curing this mixture in this closed mold against the integral skin of the polyurethane foam layer.

4. The method of claim 3, wherein said reaction mixture for obtaining the synthetic carrier has a composition and is injected into said mold in such a manner that, during injecting and curing of this reaction mixture, a pressure is exerted onto the polyurethane foam layer which is less than the pressure required for a 25% compression of this polyurethane foam layer.

5. The method of claim 4, wherein the pressure exerted is less than the pressure required for a 10% compression of the polyurethane foam layer.

6. The method of claim 3, wherein said reaction mixture for obtaining the synthetic carrier when it is injected into the mold has a viscosity at 25° C. of less than 3000 mPa.s.

7. The method of claim 6, wherein the viscosity is less than 1000 mPa.s.

8. The method of claim 3, wherein said reaction mixture for obtaining the synthetic carrier comprises a polyol component and a polyisocyanate component and is substantially free of blowing agent, the polyol component containing up to 1% by weight of water.

9. The method of claim 8, wherein the polyol component comprises up to 0.1% by weight of water.

10. The method of claim 3, wherein said mold in its closed position has at least two opposing mold surfaces, against both of said mold surfaces there is applied a polyurethane skin and a polyurethane foam layer, said reaction mixture being injected between both said foam layers for obtaining the synthetic carrier.

11. The method of claim 1, wherein said synthetic carrier is reinforced with glass fibers.

12. The method of claim 11, wherein a glass fiber mat is applied over the polyurethane foam layer before applying said reaction mixture for obtaining the synthetic carrier.

13. The method of claim 11, wherein glass fibers are admixed in said reaction mixture for obtaining the synthetic carrier.

14. The method of claim 1, wherein said elastomeric polyurethane skin is made of a thermoplastic polyurethane.

15. The method of claim 1, wherein, in said first step, to provide said elastomeric polyurethane skin, a light-stable mass-stained polyurethane reaction mixture is sprayed against said mold surface.

16. The method of claim 1, wherein a light-stable colored polyurethane paint is first applied onto said mold surface and thereafter a polyurethane reaction mixture to provide said elastomeric polyurethane skin is sprayed against this paint.

17. The method of claim 1, wherein the elastomeric polyurethane skin has a thickness of from 0.4 to 1.0 mm.

18. The method of claim 1, wherein the polyurethane foam layer has a thickness of from 2 to 3 mm.

19. The method of claim 1, wherein the polyurethane foam layer is a semi-flexible foam layer.

20. The method as claimed in claim 19, wherein said reaction mixture for obtaining the polyurethane foam layer contains a blowing agent substantially exclusively of water.

21. The method of claim 1, wherein the elastomeric polyurethane skin is formed in place against the mold surface.

22. The method of claim 1, wherein the elastomeric polyurethane skin is formed in advance and then placed against the mold surface.

23. A self-supporting synthetic trim part having a leatherlike touch comprising an elastomeric polyurethane skin having a thickness of from 0.3 to 1.3 mm, a rigid polyurethane or polyisocyanurate carrier and a polyurethane foam layer having a thickness of from 1 to 7 mm therebetween made by the method of claim 1.

\* \* \* \* \*